Feb. 9, 1937.                LA VERNE R. PHILPOTT                2,070,312
                            FACSIMILE TRANSMISSION SYSTEM
                                 Filed June 21, 1933
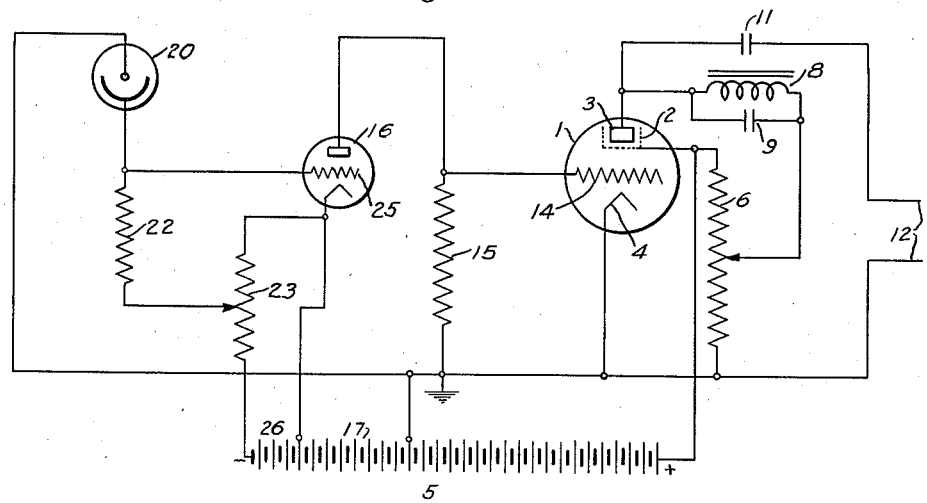
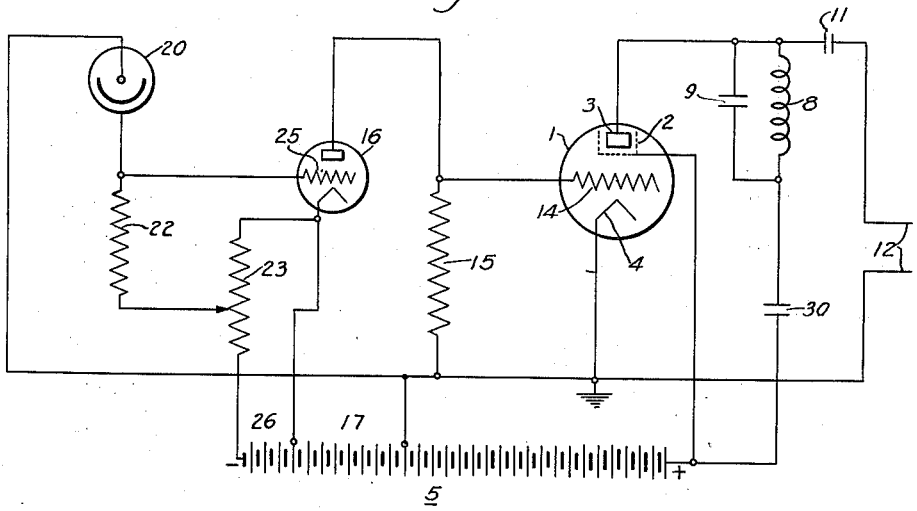
WITNESSES:
INVENTOR
La Verne R. Philpott
BY
ATTORNEY Patented Feb. 9, 1937

2,070,312

UNITED STATES PATENT OFFICE 2,070,312

FACSIMILE TRANSMISSION SYSTEM

La Verne R. Philpott, Wilkinsburg, Pa., assignor to Westinghouse Electric & Manufacturing Company, East Pittsburgh, Pa., a corporation of Pennsylvania Application June 21, 1933, Serial No. 676,833

7 Claims. (Cl. 179—171)

This invention relates to transmission systems for facsimile reproduction and particularly to a method of frequency modulation for such systems.

It has been proposed to alter the tuning of the plate circuit of an oscillation generator by means of a coil wound upon a partially saturated core. If the current producing the saturation be altered, the frequency of the oscillations generated would be altered.

My invention proposes a method for altering the frequency of the oscillations which shall be more rapid and less expensive than that in the proposal just stated. I take advantage of the fact that the frequency of the oscillations produced by an oscillator of the dynatron type can be controlled by the grid potential. It is possible to control the grid potential rapidly and inexpensively by a photo-cell.

It is an object of my invention to provide for a frequency modulation controlled by a photo-cell.

It is a further object of my invention to provide a more rapid and less expensive method for controlling the frequency in response to variations in light than has heretofore been possible.

Other objects of my invention and details of the proposed structure will be apparent from the following description in connection with the accompanying drawing, in which:

Figure 1 is a diagram illustrating the circuits and apparatus employed in one form of my invention; and Fig. 2 is a similar diagram illustrating a modification.

In Fig. 1, the vacuum tube 1 is a dynatron, as is indicated by showing the screen grid 2 at a more positive potential than the plate 3, which is positive with respect to the cathode 4.

The screen grid potential is provided from a main battery 5, one point of which is connected to the cathode 4, and grounded. The positive end of the battery 5 is connected to the screen grid 2. A potentiometer 6 in shunt to this battery, has an adjustable connection to the plate 3. This connection includes inductance coil 8 in parallel with a capacitor 9, forming a tank circuit for approximately the frequency of the oscillator. The capacitor 9 is always small and need not be an actual condenser. The distributed capacity of the inductor 8 frequency will suffice, making a condenser unnecessary. The plate 3 is connected, through a condenser 11, to one side of the line 12, the other side of this line being connected to the grounded cathode 4. The line 12 extends to any desired apparatus. In one application of my invention, it is the input connection for an amplifier (not shown) forming part of a sending set.

The grid 14 of the dynatron oscillator is connected to the ungrounded terminal of a resistor 15, which is in the plate circuit of an amplifier 16. A portion 17 of the battery 5, extending from the grounded terminal of resistor 5 to the cathode of tube 16 supplies the energy for this plate circuit. The presence of the control grid 14 results in a special type of dynatron circuit commonly referred to as a plio-dynatron.

A photo-cell 20, energized from the portion of the battery 5 between the grounded point and the negative terminal thereof, is connected in circuit with a high resistance 22 and the slider of a potentiometer 23. The terminal of the high resistance 22 adjacent the photo-cell 20 is connected to the grid 25 of the tube 16. A small portion 26 of the battery 5, connected across the resistance of the potentiometer 23, which is between the cathode of tube 16 and the negative end of the battery 5, gives an adjustable grid bias for the tube.

In the modification shown in Fig. 2 parts having the same numerals are like those in Fig. 1. The inductor 8 and the condenser 9 in Fig. 2 are so chosen that the plate circuit is suitable for audio frequency. The condenser 30 serves to connect the radio frequency, through the battery 5 to the cathode 4, but in this form no direct-current potential is supplied to the plate. The direct-current potential of the plate of the plio-dynatron circuit will not depart much from ½ screen grid potential as the tube oscillates. For audio frequencies condenser 30 is about 2 microfarads and condenser 9 if used at all, will be very small.

In the operation of the device, the photo-cell 20 is exposed to light reflected from the picture, or other subject, a facsimile of which is to be produced. Changes in light at the photo-cell 20 cause changes in current through the high resistor 22 from the negative terminal of battery 26 to the grounded anode of the photo-cell, which current changes cause changes in the potential of the control grid of the tube 16. These are amplified in the well known manner, and cause greater changes in the potential of the grid 14 of the tube 1.

The condenser 9 and the inductor 8 fix approximately the frequency generated by the dynatron oscillator 1 of the plio-dynatron circuit. The influence of the grid 14 when the adjustment is as just described causes changes in the frequency of the oscillations generated, the action of the grid under these circumstances being quite similar to the action of a changing filament current. The modulation of the output of the oscillator 1 is, therefore, not an amplitude modulation but a frequency modulation.

The magnitude of the frequency change which can be produced by changing the grid potential varies considerably with the average frequency for which the output circuit is designed. I have found one combination of circuit constants for audio frequency with which it is possible to vary the frequency over a range of ten octaves by varying the grid potential. Ordinarily the choice of circuit constants fixes the frequency within about an octave and the grid potential may vary the frequency throughout about one octave. The degree of control of frequency by grid voltage is dependent upon, among other matters, the ratio of capacity to inductance in the plate circuit, which is another reason the condenser 9 should be small if any such condenser be used.

Moreover, the changes in frequency can be very abrupt and very rapid, since the photo-cell 20 has practically no time lag, and none of the connections between it and the grid of the tube 1 are inductive.

The oscillations produced are delivered from the oscillation generator 1 over the condenser 11 to the line 12, and used in any standard or convenient facsimile transmission system. The line 12 extends to some high impedance device such as the grid-filament connection of another tube.

In one application of this invention which has been actually built and used the inductor 8 was intended for audio frequencies and had an inductance of 3 henries. The condenser associated with it was .001 microfarad to which the distributed capacity of the inductor should be added to obtain the capacity in the plate circuit. The potential supplied by the battery 5 to the screen grid 2 was 90 volts. The capacity of the condenser 11 is .01 microfarad. The resistor 6 was 1000 ohms and the connection from the inductor 8 was to the center of this resistor. The portions 17 and 26 of the battery 5 delivered some 90 volts to the photo-cell and the resistor 22 was 10 megohms. The portion 26 of the battery 5 was small and the relation between which the resistors 22 and 23 and the setting of the slider on resistor 23 were such that the grid current to the grid 25 fluctuated between 1 and 5 milliamperes. This set up gave satisfactory results in the way of frequency shift.

In general, my experiments have shown that variation of frequency with anode current is made most certain by making the capacity shunting the inductance 8 as small as possible, (so that the ratio of $$\frac{L}{C}$$

for the anode circuit is at a maximum value for a particular coil 8), whenever the insurance of such frequency variation is the primary consideration. As a typical example of the value of the ratio $$\frac{L}{C}$$

I found that in a typical oscillator connected in a circuit of the kind this application discloses and producing current having a frequency of 1000 kilocycles, the frequency began to show substantial change with variation of electron flow to the anode when the ratio of inductance to capacity of the anode circuit was increased from values below $5 \times 10^8$ to values above that figure.

Variations in the details and other departures from the specific illustration and description made herein are within the spirit of my invention. No limitation of the invention is intended except what is required by the prior art or indicated in the accompanying claims

I claim as my invention:

1. In a facsimile transmission system, the combination of an oscillation generator of the dynatron type having both a control grid and means comprising a high $$\frac{L}{C}$$

ratio tank circuit whereby the frequency of the oscillations may be varied by changes of grid potential and light-responsive means for controlling said grid potential.

2. In combination, an oscillator of the dynatron type including a tunable plate circuit having a high $$\frac{L}{C}$$

ratio, and a grid electrode, and means including a photo-cell for controlling the grid potential of said oscillator and thereby controlling the frequency of the oscillations generated.

3. In a facsimile transmission system, the combination of an oscillation generator of the dynatron type having means comprising a high $$\frac{L}{C}$$

ratio tank circuit whereby the frequency of the oscillations may be varied by changes of electron emission from the cathode to the anode, and means for controlling said electron emission to the anode.

4. In combination, an oscillator of the dynatron type including a tunable plate circuit having a high $$\frac{L}{C}$$

ratio, and means for controlling the primary emission to the anode of said oscillator and thereby controlling the frequency of the oscillations generated.

5. In combination, a plio-dynatron oscillation generator having a control electrode and a tank circuit comprising inductance and capacitance, the ratio of inductance to capacitance being high whereby a shift in frequency of said generator upon change of control electrode potential will be produced, and means for changing the control electrode potential in response to signals whereby the output of said generator will become frequency modulated in accordance with said signals.

6. In combination an oscillator of the dynatron type including a tunable tank circuit having a high $$\frac{L}{C}$$

ratio, and means for controlling the primary emission in said oscillator whereby the frequency of said oscillator may be controlled 7. In combination an oscillator of the dynatron type including a tunable tank circuit having a high $$\frac{L}{C}$$

ratio, and means for controlling the electron flow in said oscillator whereby the frequency of said oscillator may be controlled.

LA VERNE R. PHILPOTT.